Aug. 18, 1964     S. FEHRENBACH     3,144,672
WINDSHIELD WIPER ASSEMBLY
Filed Feb. 26, 1962
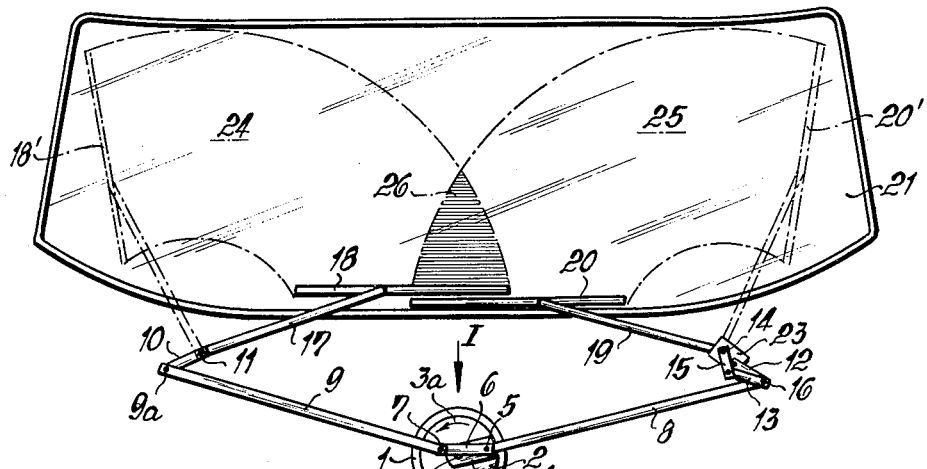
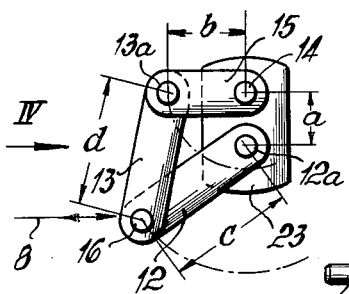
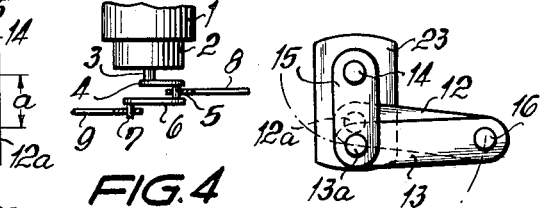
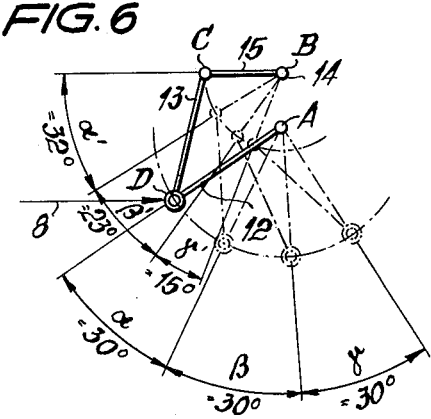
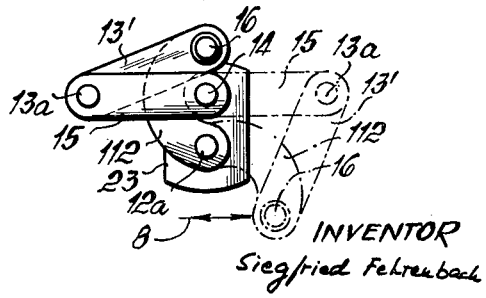
INVENTOR
Siegfried Fehrenbach
by:
Michael S. Striker
R. Horn United States Patent Office 3,144,672
Patented Aug. 18, 1964

3,144,672
WINDSHIELD WIPER ASSEMBLY
Siegfried Fehrenbach, Stuttgart, Germany, assignor to Robert Bosch G.m.b.H., Stuttgart, Germany
Filed Feb. 26, 1962, Ser. No. 175,501
Claims priority, application Germany Apr. 13, 1961
2 Claims. (Cl. 15—250.14)

The present invention relates to windshield wiper assemblies in general, and more particularly to improvements in windshield wiper assemblies of the so-called butterfly type in which one of a pair of wiper blades partially overlaps the other blade in one end position of the blades.

An important object of the invention is to provide an improved reversing mechanism for the overlapped wiper blade which mechanism is constructed and assembled in such a way that it positively prevents any interference on the part of the overlapped blade with the overlapping blade when the two blades oscillate between their respective end positions.

Another object of the invention is to provide a readily adjustable reversing mechanism of the just outlined characteristics.

A further object of the instant invention is to provide a windshield wiper assembly in which at least one of the wipers receives motion through a reversing mechanism in the form of a four-bar linkage which latter is adjustably supported on the automotive vehicle so that the speed and the amplitude of that blade which receives motion from this linkage may be controlled and changed in a very simple manner.

An additional object of the invention is to provide a four-bar linkage of the above outlined characteristics which is constructed and mounted in such a way that the wiper blade receiving motion from this linkage may be oscillated through a large angle in response to comparatively small throws of cranks which form part of the linkage.

A concomitant object of the invention is to provide a windshield wiper assembly of the above described type which occupies little space and which, therefore, may be mounted on all or nearly all types of motor vehicles which are equipped with a windshield.

With the above objects in view, the invention resides in the provision of a windshield wiper assembly including a pair of windshield wipers having windshield-engaging blades and oscillatably mounted on a pair of spaced fixed shafts so that the blades are oscillatable about the axes of the respective shafts between first end positions in which they are spaced from each other and second end positions in which one of the blades overlaps the other blade, and means for moving the blades between their respective end positions so that the overlapped blade trails the overlapping blade when the blades are moved from the second to the first end positions thereof. This moving means comprises reciprocating means including first and second motion transmitting means, and first and second reversing means each of which is operatively connected with one of the wipers and with one of the motion transmitting means, and at least that reversing means which is associated with the overlapped blade comprises a four-bar linkage.

The novel features which are considered as characteristic of the invention are set forth in particular in the appended claims. The invention itself, however, both as to its construction and its method of operation, together with additional objects and advantages thereof, will be best understood from the following detailed description of two specific embodiments with reference to the accompanying drawings, in which:

FIG. 1 is a schematic front elevational view of a windshield wiper assembly which embodies one form of my invention;

FIG. 2 is a fragmentary detail view of the assembly as seen in the direction of the arrow I in FIG. 1, showing a moving means for the wiper blades including rotary drive means and means which transforms rotary motion of the drive means into reciprocatory motion of two reversing means;

FIG. 3 is an enlarged front elevational view of a reversing means in the form of a four-bar linkage which constitutes a novel element of the assembly shown in FIG. 1;

FIG. 4 is a side elevational view of the four-bar linkage as seen in the direction of the arrow IV in FIG. 3;

FIG. 5 is a front elevational view of the four-bar linkage in a different position;

FIG. 6 is a schematic diagram illustrating the operation of the four-bar linkage; and FIG. 7 is a front elevational view of a modified four-bar linkage in one end position thereof, the second end position of the modified linkage being shown in phantom lines.

Referring now in greater detail to the illustrated embodiments, and first to FIG. 1, there is shown a windshield wiper assembly which is utilized for wiping the outer side of a windshield 21 in an automotive vehicle. This assembly comprises a drive means including an electric motor 1 which drives a speed reducer gear 2 (see FIG. 2) so that the output shaft 3 of the gear 2 rotates in the direction indicated by the arrow 3a (i.e. anticlockwise, as viewed in FIG. 1). The output shaft 3 is rigid with one end of a crank arm 4 whose other end carries a pin 5, the latter rigid with one end of a second crank arm 6 which carries at its other end a second pin 7. The pin 7 extends from that side of the crank arm 6 which is turned away from the crank arm 4 (see FIG. 2) and is articulately connected to one end of an elongated motion-transmitting connecting rod 9 whose other end is articulately connected by a pivot pin 9a with one end of a reversing means in the form of a lever 10. The other end of the lever 10 is rockable about the axis of a fixed shaft 11 which is secured to the frame of the automotive vehicle at a point below the windshield 21. The lever 10 oscillates a wiper including a wiper arm 17 and a wiper blade 18 whose head engages the outer side of the windshield 21 and which is swingable about the axis of the fixed shaft 11 between the full-line position and the phantom-line position 18'.

The parts 4–7 form a rigid unit whose pins 5 and 7 are eccentric to the output shaft 3. One end of a second connecting rod 8 is articulately fixed to the crank pin 5, and the other end of this connecting rod is articulately fixed to a pivot member 16 forming part of a second reversing means in the form of a four-bar linkage (also called quadric-crank chain), shown in greater detail in FIGS. 3 to 5. The unit 4–7 and the connecting rods 8, 9 together constitute means for transforming rotary motion of the drive means 1–3 into oscillatory or reciprocatory motion of the reversing lever 10 and of the four-bar linkage. The purpose of the connecting rod 8 is to oscillate a crank 12 which forms part of the four-bar linkage and which is turnable about a crank pin 12a fixed to a platelike supporting member 23. This suppjorting member carries a bearing sleeve 22 which is detachably mounted beneath the windshield 21 and which is spaced from the fixed shaft 11 for the blade 18. In addition to the parts 12, 12a, 16 and 23, the four-bar linkage comprises a link 13 one end of which is articulately fixed to the pivot member 16 and the other end of which is articulately fixed to a second pivot member 13a, and a second crank 15 which is articulately fixed to the pivot member 13a and to one end of a fixed shaft 14 which is turnable in the sleeve 22 and which is rigidly connected with a second wiper including a wiper arm 19 and a wiper blade 20. The latter is swingable between its full-line position and the phantom-line position 20', and the arrangement is such that the area 24 swept by the blade 18 partly overlaps the area 25 swept by the blade 20, the zone 26 of overlap being indicated in FIG. 1 by cross-hatching. When the wiper blades 18, 20 assume their full-line end positions, the blade 18 overlaps the blade 20, i.e. the trailing blade 20 must be moved in such a way that, while advancing toward the end position 20', it cannot catch up and cannot interfere with the leading blade 18. The manner in which the blades 18, 20 cooperate to sweep the outer side of the windshield 21 is known as the butterfly style of windshield wiping operation.

In FIG. 3, the character $a$ indicates the distance between the points about which the cranks 12, 15 pivot (i.e. the distance between the axis of the fixed shaft 14 and the axis of the crank pin 12a). The effective length $b$ of the crank 15 is less than the effective length $c$ of the crank 12 (i.e. the distance between the axes of the parts 13a, 14 is less than the distance between the axes of the parts 12a, 16), and the effective length $d$ of the link 13 is greater than the length $b$. The distance $a$ is less than the length $d$.

In the schematic illustration of FIG. 6, the parallel axes of the parts 12a, 14, 13a and 16 are respectively identified by reference characters A, B, C and D, and the position of the parts 12, 13, 15 corresponds to their position of FIG. 3. The connecting rod 8 acts on the pivot member 16, i.e. on the axis D, and is assumed to be about to swing the four-bar linkage in anticlockwise direction so that the cranks 12, 15 are respectively caused to swing anticlockwise about the axes A and B. The movements transmitted by the rod 8 to the crank 12 are transmitted to the crank 15 by the link 13 because the latter is articulately fixed to the pivot members 13a and 16. However, the throw of the crank 12 is different from the throw of the crank 15. In the embodiment which is illustrated in FIG. 5, the dimensioning of the four-bar linkage is such that the crank 12 describes an angle $\alpha=30°$ when the crank 15 describes an angle $\alpha'=32°$, it being assumed that the blade 20 was in the phantom-line position 20' and that it begins to move toward the full-line position of FIG. 1. When the crank 12 thereupon describes a second angle $\beta=30°$ by rotating anticlockwise about the axis A, the crank 15 describes an angle $\beta'=23°$. In the last stage, an angular movement of the crank 12 through an angle $\gamma=30°$ corresponds to an angular movement of the crank 15 through an angle $\gamma'=15°$. When the crank 12 was turned through an angle $\alpha+\beta+\gamma=90°$, the pivot axis D is assumed to take the position E, and the blade 20 is assumed to have reached the full-line position of FIG. 1 in which it is overlapped by the blade 18.

The situation is reversed when the connecting rod 8 thereupon begins to turn the four-bar linkage in clockwise direction in response to continued anticlockwise rotation of the output shaft 3 (arrow 3a in FIG. 1). Of course, and as can be readily determined by an observation of FIG. 1, the connecting rod 9 turns the reversing lever 10 in anticlockwise direction (about the axis of the fixed shaft 11) when the four-bar linkage is turned in clockwise direction, and vice-versa.

When the crank 12 begins to move clockwise from the phantom-line position 12' of FIG. 5 so as to describe an angle $\gamma=30°$, the lever 10 also describes an angle of 30° but the crank 15 describes an angle $\gamma'=15°$ so that the blade 20 trails the blade 18. Consequently, in the zone 26 the blade 20 lags behind and cannot interfere with the blade 18. In other words, the acceleration of the blade 20 is less than the acceleration of the blade 18 to insure that the two blades remain spaced from each other at the time they begin to move from their full-line positions toward the phantom-line position 18', 20'. Once the end portions of the blades 18, 20 leave the zone 26, the blade 20 may be turned at a higher speed because it now moves away from the blade 18.

The acceleration and the amplitude or range of the blade 20 may be adjusted by changing the position of the four-bar linkage. All that is necessary is to separate the supporting member 23 and the sleeve 22 from the frame and to turn these parts to a new position of adjustment with respect to the frame.

The modified four-bar linkage of FIG. 7 differentiates from the linkage of FIGS. 3 to 5 in that the crank 112 assumes an arcuate shape so that, when in the full-line end position of FIG. 7, this crank straddles (i.e. partially surrounds) the fixed shaft 14. Such linkage is especially suited for use in windshield wiper assemblies in which, starting from one end position of the respective blade (20), the crank 15 should turn the fixed shaft 14 through a comparatively large angle in response to comparatively small throw of the arcuate crank 112.

It will be readily understood that the reversing means 10 of the assembly shown in FIG. 1 may be replaced by a four-bar linkage mounted in such a way that the wiper blade 18, starting from its full-line position, would move toward the position 18' faster than the blade 20 can move toward the position 20', i.e. that the two blades cannot interfere with each other in the zone 26.

It is further understood that the connecting rod 8 may be directly fixed to the crank 12 or 112, to the link 13, or to the crank pin 16. If connected to the link 13, the point of connection of the rod 8 is preferably close to the pin 16.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a windshield wiper assembly, in combination, a first and a spaced second fixed shaft; a first and second wiper, said wipers being supported by and being rotable about the axes of the respective shafts and each having a windshield-engaging blade, said blades oscillatable about the axes of the respective shafts between first end positions in which they are spaced from each other and second end positions in which the blade of said first wiper overlaps the blade of said second wiper; and means for moving said blades between said end positions thereof so that the blade of said second wiper trails the blade of said first wiper when the blades are moved from the second toward the first end positions thereof, said last mentioned means comprising reciprocating means including first and second motion transmitting means, and first and second reversing means operatively connected with the respective motion transmitting means and with the respective wipers, at least said second reversing means comprising a quadric-crank chain including a first crank drivingly connected to said second wiper, an arcuate second crank having a first end and a second end, fixed crank pin means for turnably supporting the first end of said second crank, a link having a first end and a second end, first pivot means for articulately connecting the second end of said second crank with the first end of said link, and second pivot means for articulately connecting the second end of said link with said first crank, said second crank straddling said second fixed shaft when the blade of said second wiper assumes said second end position.

2. In a windshield wiper assembly, in combination, a first and a spaced second fixed shaft; a first and a second wiper, said wipers being supported by and being rotatable about the axes of the respective shafts and each having a windshield-engaging blade, said blades being oscillatable about the axes of the respective shafts between first end positions in which they are spaced from each other and second end positions in which the blade of said first wiper overlaps the blade of said second wiper; and means for moving said blades between said end positions thereof so that the blade of said second wiper trails the blade of said first wiper when the blades are moved from the second toward the first end positions thereof, said last mentioned means comprising reciprocating means including first and second crank-operated motion transmitting means, and first and second reversing means operatively connected with the respective motion transmitting means and with the respective wipers, said second reversing means comprising a quadric-crank chain including a first crank drivingly connected with said second wiper and rotatable about the axis of said second fixed shaft, a second crank of arcuate shape, fixed crank pin means for rotatably supporting said second crank, said quadric-crank chain being arranged to impart to said second wiper an acceleration which is less than the acceleration imparted to said first wiper by said first reversing means when said wipers move from their second end positions and said second crank straddling said second fixed shaft when the second wiper assumes said second position.

References Cited in the file of this patent

UNITED STATES PATENTS 2,733,609  Latta _____ Feb. 7, 1956

FOREIGN PATENTS 853,835  Great Britain _____ Nov. 9, 1960